Dec. 13, 1955  W. C. SCHACHER  2,726,690
CONTOUR GUIDE FOR ROUTERS
Filed July 31, 1951
Fig. 1.
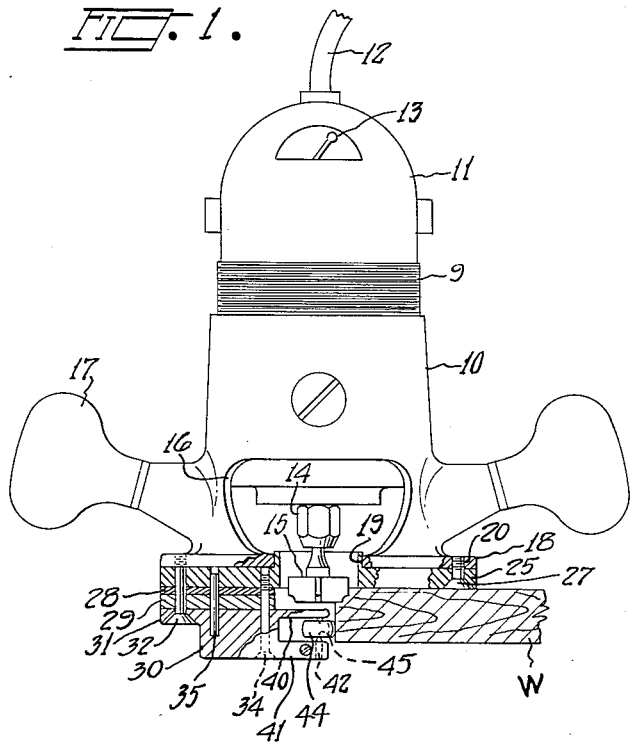
Fig. 2.
Fig. 3.
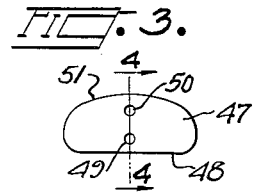
Fig. 4.
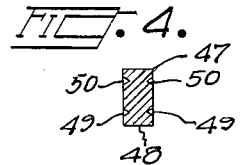
Fig. 5.
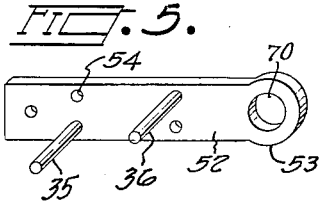
Fig. 6.
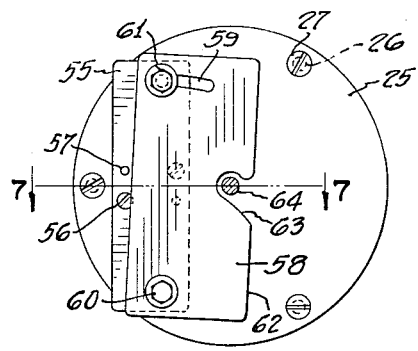
Fig. 7.
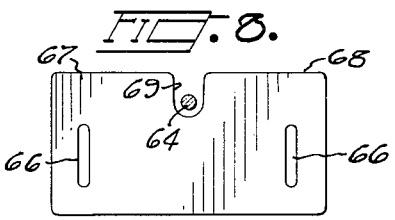
Fig. 8.
INVENTOR
WALTER C. SCHACHER
BY Cook and Schermerhorn
ATTORNEYS

United States Patent Office 2,726,690
Patented Dec. 13, 1955

2,726,690

CONTOUR GUIDE FOR ROUTERS

Walter C. Schacher, Portland, Oreg.

Application July 31, 1951, Serial No. 239,455

5 Claims. (Cl. 144—137)

This invention relates to improvements in attachments for power tools and the like, and is especially adaptable to portable routers.

It is an object of the present invention to provide an attachment for a portable router and the like which is effective to guide accurately the router cutter bit along the contour of an edge of a workpiece.

Another object is to provide an attachment for a portable router which has means for adjustably controlling the vertical position of a guide member.

Another object is to provide an attachment which has means for adjustably controlling the depth of radial cut into the workpiece.

Other objects are to provide an attachment for portable routers which is easy to install and remove, and which is simplified in construction and inexpensive to manufacture.

The present invention is especially suitable for attachment to those types of portable routers which are provided with a flat base member, the base member having a central aperture through which the shank and cutter bit or blade extend, said shank being detachably secured in a chuck on the motor shaft. The attachment comprises essentially a supporting plate or flat guide plate which carries various types of members for guiding the cutter bit along the workpiece. The plate is secured to the bottom surface of the router base, and has a central aperture which communicates with the aperture of the router base. In one form of the invention, the plate is adapted to carry a bracket or guide member having a pair of arms for mounting therebetween various guides which may comprise rollers of various diameters, or other members having a smooth workpiece engaging surface, depending on the type of work. The invention also contemplates guide members for attachment to the router which are useful for other types of cutting tools such as saw blades.

The invention will be better understood and additional objects and advantages will become apparent from the following description taken in connection with the accompanying drawings. The invention is shown in its preferred forms, but it is to be understood, however, that still other forms may be apparent to persons skilled in the art and the invention is limited only by the scope of the appended claims.

In the drawings:

Figure 1 is a side elevation view of the invention attached to a conventional portable router, parts of the router and attachment being shown in section;

Figure 2 is a bottom plan view of the device of Figure 1 showing a roller engaging an edge of the workpiece to guide the router therealong;

Figure 3 is a plan view of a guide having elongated edge surfaces for engaging the workpiece;

Figure 4 is a section view taken on the line 4—4 of Figure 3;

Figure 5 is a perspective view of a simplified form of guide for engaging the workpiece;

Figure 6 is a bottom plan view of a further form of the invention showing an adjustable plate which engages the workpiece and serves as a guide;

Figure 7 is a section view taken on the line 7—7 of Figure 6; and

Figure 8 is a plan view of another form of guide comprising an adjustable plate for adjusting the cutter tool laterally relative to the workpiece.

Although the present invention is applied advantageously to a portable router, it may, of course, be used in conjunction with other power tools such as hand shapers and planes and like tools which are readily manipulable and are guided along a contour of a workpiece. It is also to be understood that the power unit with one of the devices of the invention attached thereto may be secured to a workbench and workpieces moved relative to the tool. Various types of cutter bits and saw blades are used with a router to cut grooves in workpieces or to form various designs as when cutting molding.

Figure 1 shows one embodiment of the invention attached to a router. Such routers are usually equipped with a base portion 10 and a high speed motor 11 which operates at speeds from 7,000 to 18,000 R. P. M. The motor has a lead-in wire 12 and a switch 13, the shaft of the motor extending downwardly and being provided with a chuck 14 for receiving the shank of a router bit 15. The motor housing is provided with external screw threads 9 and is screw threaded into the base 10, the vertical depth of cut thus being adjustable by rotation of the two parts relative to each other. The router has an enlarged side opening 16 for providing access to the chuck when a router bit is to be inserted or removed. Suitable handles 17 are mounted on the router for manual manipulation. The router base 10 has a flat bottom portion 18 and an enlarged central aperture 19. The bottom surface of the base 18 has a plurality of threaded holes 20 adjacent the periphery thereof.

The present invention resides in novel means adapted to be mounted on the bottom surface 18 of the router. A preferred form of the device comprises a circular disc or flat guide plate 25 which has a plurality of holes 26 adjacent its outer periphery corresponding in number and location to the threaded holes 20 in the base of the router. Screws 27 are inserted in the holes and engage the screw-threaded holes 20 to firmly hold the plate 25 on the router. Mounted on the bottom surface of the plate 25 is a shim 28, a spacer block 29, and a bracket or guide member 30. These three members are held together by screws 32, 33 and 34. The member 30 has a single arm 31 extending in one direction, and this arm has a hole for receiving a screw 32 which extends through all the members and engages one of the threaded holes 20 in the base of the router. Other screws 33 and 34 are contained in bores in the members 28—30 and engage screw threaded bores in the plate 25 to hold the device together as an integral unit. The members 28—30 are also provided with additional bores to receive guide pins 35 and 36 which further hold the members in alignment and serve as a guide in assembly. The shims 28 are inserted between the plate 25 and the bracket member 30 to vary the distance therebetween as when it is desired to raise or lower the members 30 on the edge of the workpiece.

As best seen in Figure 1, the bracket member 30 has a pair of arms 40 and 41 on the opposite end from the arm 31. Each of the arms 40 and 41 is provide with a pivot pin 42 screw threaded into tapped holes adjacent the ends thereof for receiving therebetween a guide comprising a roller 44 for engaging an edge of a workpiece W. The roller has a shallow hole 45 on each end surface to receive the pivot points. The shanks of pivot pins 42 have sockets formed in the ends opposite from the pin points and are of such length as to extend substantially through the arms so that the sockets may be reached with a socket wrench when it is desired to remove the roller 44 or adjust the pins on the roller.

The router is guided along the contour of an edge of the board or other workpiece W by the roller 44, with plate 25 sliding on the top face of the board, and the board is cut or grooved by the bit 15. The radial distance of cut of the bit into the workpiece W is controlled by inserting rollers of varying diameters, the larger the roller the smaller the cut produced. Rollers 44 are used advantageously on either straight or curved surfaces. The axis of the pivot pins 42 and the cutter bit 15 coincide so that a uniform cut will be maintained as the router is guided along the contour of the workpiece W, and the router may be slightly rotated without varying the depth of cut.

The three members 28, 29 and 30 may be cast as an integral unit where the guide is to be used on workpieces which do not vary in thickness and it would not be necessary to adjust the guide vertically.

Figures 3 and 4 show another form of guide 47 which is adapted to be pivotally mounted on pivot pins 42 between the arms 40 and 41 of the bracket member 30. This type of guide has one straight edge 48 and one curved edge 51 for engaging the workpiece and is used advantageously when the guiding surface of the workpiece is not precisely smooth, the elongated surface 48 riding over pits and the like to maintain a smooth cut by the router bit. When guide 47 is thus mounted on pivot pins 42 the flat edge surface 48 extends in a plane parallel with the axis of the cutter and the long dimension of said surface extends transversely of said axis. The curved edge 51 is used to engage the curvaceous edge of a workpiece of irregular shape. The guide 47 has two sets of shallow holes 49 and 50 in the top and bottom so that it can be engaged by pivot pins 42 when mounted on the plate, similar to the roller shown in Figure 1. The distance of radial cut into the board is varied depending on the set of holes used. For example, when the guide 47 is mounted on the bracket 30 so that the pivot pins 42 engage the pair of holes 49 adjacent the surface 48, the bit will cut into the workpiece W a maximum distance, the distance of cut being shortened when the pivot pins engage the other set of holes 50 set back from the surface 51. It is to be understood that the guide 47 may have as many sets of holes as is desired to provide a multiple adjustment guide.

Figure 5 shows a simplified form of guide comprising an arm 52 having a rounded end 53. This arm is intended to be susbtituted for the member 30 of Figure 1 and is provided with a series of holes 54 coinciding in position to the holes of the member 30 in order to receive screws 32, 33 and 34 and guide pins 35 and 36. The rounded end 53 engages the edge of the workpiece, and may be adjusted vertically from the disc 25 by the insertion or removal of shims 28. The center of the rounded end 53 is concentric with the cutter bit and the router may thereby be rotated without altering the depth of cut of the cutter bit or blade into the workpiece. To vary the radial distance of cut by the cutter bit or blade into the workpiece, a number of arms 52 may be provided having end portions 53 of varying radii, such adjustment being similar to the disclosure of providing rollers 44 of different diameters in the embodiment of Figure 1.

Figures 6 and 7 show a further form of the invention. An adapter bar 55 is secured to disc 25 by screws 56 and guide pins 57. A plate 58 which serves as a guide has an arcuate slot 59 adjacent one end and a bore adjacent the other end to receive screws 60 and 61. Each of these screws engages tapped holes in the bar 55 for securing the plate 58 to the bar 55 in adjusted position. The plate is allowed to pivot on the screw 60 with the slot 59 sliding relative to the screw 61 which serves as a clamp screw. The plate 58 has a straight forward edge 62 which engages the workpiece, and it is thus seen that by loosening the screw 61 one end of the plate can be adjusted so that the cutter bit can be moved relative to the edge 62 and the workpiece to control the depth of lateral cut. A portion of the plate is grooved at 63 to receive the shank 64 of a cutter blade 65, the wall of the groove closest to the pivot 60 being arcuately shaped to allow the plate 58 to pivot away from the shank.

The embodiment of Figures 6 and 7 is used to advantage with a saw blade 65, Figure 7, but any other type of cutter blade may be used. The forward edge of the plate 58 engages the edge of the workpiece W and guides the saw blade 65 uniformly along the edge. The saw blade is shown below the plate 58 in Figure 7, but by adjustment of the motor 11 in the base 10 the blade can be moved vertically to any position desired. The bar 55 may be of any thickness or shims may be placed between the bar and the plate 25 to raise or lower the guide surface 62 of the plate 58. Thus, if a saw cut was desired at a point where the plate 58 is positioned as in Figure 7, the saw blade could be raised as described and a shim readily inserted between the bar 55 and plate 25 to lower the plate 58.

Figure 8 shows a guide plate 67 somewhat similar to the plate 58 shown in Figure 6. The plate 67, however, has slots 66 adjacent two ends to receive the screws 60 and 61 and slide relative thereto. Rectilinear movement of the plate 67 is thus accomplished for adjusting the radial distance of cut of the cutter bit into the workpiece, the plate 67 being held in position by tightening the screws 60 and 61. A straight edge surface 68 is also provided on the plate 67 for guiding the router and has a groove 69 to receive the shank 64 of the cutter blade.

In the embodiments of Figures 6 and 8, the guide plates 58 and 67, respectively, may be provided with circular holes instead of the elongated grooves 63 and 69 shown on the drawings. In either event, it is to be understood that the cutter blade or bit may be disposed either above or below the guide plate, as desired, depending on the type of workpiece to be engaged. Also, the embodiment of Figure 5 may be provided with a hole 70 adjacent the guiding surface 53 to receive the shank of a cutter bit so that the cutter bit can extend through the guide when it is desired that the cutter bit engage the workpiece below the point of contact between the guiding edge 53 and the workpiece.

Most of the parts of the device, for example, the shims 28, spacer block 29, and plate 25, may be constructed of a light, inexpensive material such as a suitable synthetic plastic, but it is preferred to cast the member 30 from metal to provide a rigid support for the workpiece engaging members.

Having now described my invention and in what manner the same may be uesd, what I claim as new and desire to protect by Letters Patent is:

1. In a power tool having a rotary cutter, a flat plate mounted on the base of said tool perpendicular to the longitudinal axis of the cutter for engaging a principal surface of a workpiece and supporting the tool relative to an edge surface thereof, a guide supporting structure mounted on the undersurface of said plate and having a pair of arms intersecting the plane of the longitudinal axis of said cutter, and a guide pivotally mounted between said arms and having a work engaging surface for engaging an edge of the workpiece to limit the depth of cut of said rotary cutter, said guide supporting structure providing for mounting said guide in axially spaced relation to said cutter.

2. The power tool defined by claim 1 wherein the guide is mounted beyond the end of the cutter with its pivotal axis coaxial with the cutter, the coaxial relationship of the cutter and guide maintaining a uniform depth of cut when the cutter is rotated relative to the workpiece.

3. The power tool defined by claim 1 wherein the pivotal mounting for the guide comprises a pair of opposed pivots aligned with the longitudinal axis of the cutter, and said guide is rotatably mounted between said arms on said pivots.

4. In a power tool having a rotary cutter, a flat plate mounted on the base of said tool perpendicular to the longitudinal axis of the cutter for engaging a principal surface of a workpiece and supporting the tool relative to an edge surface thereof, a guide supporting structure mounted on the undersurface of said plate, and a guide pivotally mounted on said supporting structure having an elongated edge surface for engaging an edge of the workpiece to limit the depth of cut of said rotary cutter, the edge surface of said guide extending in a plane parallel with the axis of said cutter with the long dimension of said surface extending transversely of said axis.

5. The power tool defined by claim 4 wherein the guide is mounted with its pivotal axis coaxial with the rotary cutter.

References Cited in the file of this patent

UNITED STATES PATENTS

| | | |
|---|---|---|
| 359,071 | Graham | Mar. 8, 1887 |
| 692,028 | Page | Jan. 28, 1902 |
| 1,206,461 | Nickelson | Nov. 28, 1916 |
| 1,361,377 | Forster | Dec. 7, 1920 |
| 1,432,910 | Roy | Oct. 24, 1922 |
| 1,506,154 | Berthelsen et al. | Aug. 26, 1924 |
| 1,566,824 | Carter | Dec. 22, 1925 |
| 1,748,767 | Heston et al. | Feb. 25, 1930 |
| 1,983,719 | Windnagel | Dec. 11, 1934 |
| 2,140,120 | Tomarin | Dec. 13, 1938 |
| 2,238,304 | Belanger | Apr. 15, 1941 |
| 2,400,933 | Johnson et al. | May 28, 1946 |
| 2,466,045 | Schuler | Apr. 5, 1949 |
| 2,587,994 | Gregory | Mar. 4, 1952 |